United States Patent
Choi et al.

(10) Patent No.: US 11,416,020 B2
(45) Date of Patent: Aug. 16, 2022

(54) INTEGRATED DRIVING CONTROL DEVICE

(71) Applicants: Hyundai Motor Company, Seoul (KR); Kia Motors Corporation, Seoul (KR); SL Corporation, Daegu (KR)

(72) Inventors: Jee Hyuck Choi, Hwaseong-si (KR); Gi Man Park, Daegu (KR); Hong Jun Cha, Daegu (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 18 days.

(21) Appl. No.: 17/036,646

(22) Filed: Sep. 29, 2020

(65) Prior Publication Data

US 2021/0365063 A1    Nov. 25, 2021

(30) Foreign Application Priority Data

May 25, 2020 (KR) .................. 10-2020-0062170

(51) Int. Cl.
| | |
|---|---|
| *G05G 9/04* | (2006.01) |
| *B62D 1/02* | (2006.01) |
| *B60K 26/02* | (2006.01) |
| *B60T 7/08* | (2006.01) |
| *G05G 5/03* | (2008.04) |
| *F16H 59/12* | (2006.01) |
| *G05G 1/01* | (2008.04) |
| *G01B 7/30* | (2006.01) |
| *G01D 5/14* | (2006.01) |

(Continued)

(52) U.S. Cl.
CPC ............... *G05G 9/04* (2013.01); *B60K 26/02* (2013.01); *B60T 7/085* (2013.01); *B62D 1/02* (2013.01); *F16H 59/12* (2013.01); *G01B 7/30* (2013.01); *G01D 5/145* (2013.01); *G05G 1/01* (2013.01); *G05G 5/03* (2013.01); *G05G 5/05* (2013.01); *F16H 1/06* (2013.01)

(58) Field of Classification Search
CPC .. G05G 9/04; G05G 1/01; G05G 5/03; G05G 5/05; B60K 26/02; B60T 7/085; B60D 1/02; F16H 59/12; F16H 1/06; F16H 2059/081; G01B 7/30; G01D 5/145
See application file for complete search history.

(56) References Cited

U.S. PATENT DOCUMENTS

| | | | | |
|---|---|---|---|---|
| 4,476,954 A | * | 10/1984 | Johnson | B60W 30/18 123/352 |
| 6,880,855 B2 | * | 4/2005 | Chernoff | B60T 7/02 280/778 |

(Continued)

FOREIGN PATENT DOCUMENTS

KR    102018-0042556 A    4/2018

*Primary Examiner* — Thomas C Diaz
(74) *Attorney, Agent, or Firm* — Morgan, Lewis & Bockius LLP

(57) ABSTRACT

An integrated driving control device configured to integrally control acceleration, deceleration, shifting and steering of a vehicle, may include a knob unit, a rotating unit engaged to the knob unit and configured to control steering of a vehicle in a response to rotation of the knob unit, and a sliding unit engaged to the rotating unit and configured to control acceleration and deceleration of the vehicle in a response to sliding movement of the knob unit.

19 Claims, 14 Drawing Sheets

(51) Int. Cl.
*G05G 5/05* (2006.01)
*F16H 1/06* (2006.01)

(56) References Cited

U.S. PATENT DOCUMENTS

| | | | | |
|---|---|---|---|---|
| 6,898,496 B2 * | 5/2005 | Chernoff | ................ | B60K 26/02 |
| | | | | 701/41 |
| 8,005,588 B2 * | 8/2011 | Dower | ................. | B60W 10/10 |
| | | | | 701/22 |
| 9,334,952 B2 * | 5/2016 | Tokumo | ................. | F16H 59/08 |
| 9,970,538 B2 * | 5/2018 | Chen | ....................... | F16H 59/08 |
| 2016/0017983 A1 * | 1/2016 | Levesque | ................ | F16H 61/24 |
| | | | | 74/473.25 |
| 2021/0190202 A1 * | 6/2021 | Alu | ........................ | F16H 59/08 |

\* cited by examiner

INTEGRATED DRIVING CONTROL DEVICE

CROSS-REFERENCE TO RELATED APPLICATION

The present application claims priority to Korean Patent Application No. 10-2020-0062170 filed on May 25, 2020, the entire contents of which is incorporated herein for all purposes by this reference.

BACKGROUND OF THE INVENTION

Field of the Invention

The present invention relates to an integrated driving control device. More particularly, it relates to an integrated driving control device configured to integrally control acceleration, deceleration, shifting and steering of a vehicle.

Description of Related Art

Driving or operating a vehicle requires steering control for controlling the travel direction of the vehicle, acceleration control for controlling the acceleration of the vehicle, braking control for controlling the deceleration of the vehicle, and shift control for controlling shift of the vehicle.

To perform the above control operations, various operation mechanisms are mounted in a vehicle. As shown in FIG. 1, a vehicle is provided with, as operation mechanisms, a steering wheel SW for steering control, an accelerator pedal AP for acceleration control, a brake pedal BP for deceleration and braking control, and a shift lever TL for proceeding direction control. These driving-related devices occupy a large amount of cabin space in the vehicle.

With the continuous development of intelligent technology, an autonomous driving system where a vehicle is capable of traveling by itself has recently been developed. The autonomous driving system not only allows a driver to drive a vehicle by herself or himself but also enables autonomous travel of a vehicle. During autonomous travel of a vehicle, a driver can handle other businesses at hand.

In such an autonomous vehicle, the role of a driver may be minimized. Accordingly, the roles of conventional driving-related devices provided in the interior of a vehicle may also be reduced. Therefore, there is a demand for novel devices capable of simplifying the driving-related devices.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an integrated driving control device configured for simplifying various vehicle-control-related operation mechanisms that are provided in the interior of a vehicle.

Various aspects of the present invention are directed to providing an integrated driving control device configured for maximizing the utilization of the indoor space in a vehicle through simplification of the operation mechanisms.

It is a further object of the present invention to provide an integrated driving control device configured for reducing the weight of a vehicle and manufacturing costs.

It is yet another object of the present invention to provide an integrated driving control device configured for simplifying and facilitating various control operations.

The objects of the present invention are not limited to the above-mentioned objects, and other objects not mentioned herein will be clearly understood by those skilled in the art from the following description.

Various aspects of the present invention are directed to providing an integrated driving control device including a knob unit, a rotating unit engaged to the knob unit and configured to control steering of a vehicle in a response to rotation of the knob unit, and a sliding unit engaged to the rotating unit and configured to control acceleration and deceleration of the vehicle in a response to sliding movement of the knob unit.

In various exemplary embodiments of the present invention, the sliding unit is configured to control shifting of the vehicle in a response to the sliding movement of the knob unit.

In various exemplary embodiments of the present invention, the rotating unit includes a first gear connected to the knob unit and configured to rotate in a response to rotation of the knob unit.

In various exemplary embodiments of the present invention, the integrated driving control device further includes a steering angle sensor. The steering angle sensor may include a second gear gear-engaged with the first gear and configured to rotate in engagement with the first gear, a first magnet member mounted at the second gear, and a steering-angle-detecting Hall effect sensor magnetically-engaged to the first magnet member and configured to detect the rotation angle of the second gear based on a change in a magnetic field caused by a rotation of the first magnet member.

In various exemplary embodiments of the present invention, the integrated driving control device further includes a torsion spring configured to provide reaction force with respect to rotation of the knob unit and the first gear.

In various exemplary embodiments of the present invention, the sliding unit includes a slider supporting the knob unit and a guide member coupled to the slider to enable sliding movement of the slider.

In various exemplary embodiments of the present invention, the integrated driving control device further includes a displacement sensor. The displacement sensor may include a second magnet member mounted at the slider and a displacement-detecting Hall effect sensor securely mounted adjacent to the second magnet member and configured to detect the moving direction and the moving distance of the slider based on a change in a magnetic field caused by movement of the second magnet member.

In various exemplary embodiments of the present invention, the integrated driving control device further includes a pedal force transmission portion. The pedal force transmission portion may include an extension member extending from the slider and a retractable member slidably coupled to the extension member and having a length adjustable relative to the extension member.

In various exemplary embodiments of the present invention, the integrated driving control device further includes an auxiliary member. The auxiliary member may include a motion surface on which the retractable member is movable, and a groove concavely formed in the motion surface.

In various exemplary embodiments of the present invention, the piston member may be formed such that the cross-sectional area of an end portion thereof which is in contact with the auxiliary member is gradually decreased toward a tip portion thereof and such that the tip portion thereof is formed to be curved.

In various exemplary embodiments of the present invention, the knob unit is provided with at least one of a P-button for shifting to the parking range of the vehicle or an R-button for shifting to the reverse range of the vehicle.

In various exemplary embodiments of the present invention, the knob unit is configured to be movable in one of a first direction and a second direction opposite to the first direction thereof. When the knob unit is moved in the first direction while the vehicle is traveling, the vehicle may be decelerated. When the knob unit is moved in the first direction while the vehicle is stopped, the vehicle may travel backwards.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the present invention are discussed infra.

Figure 1:
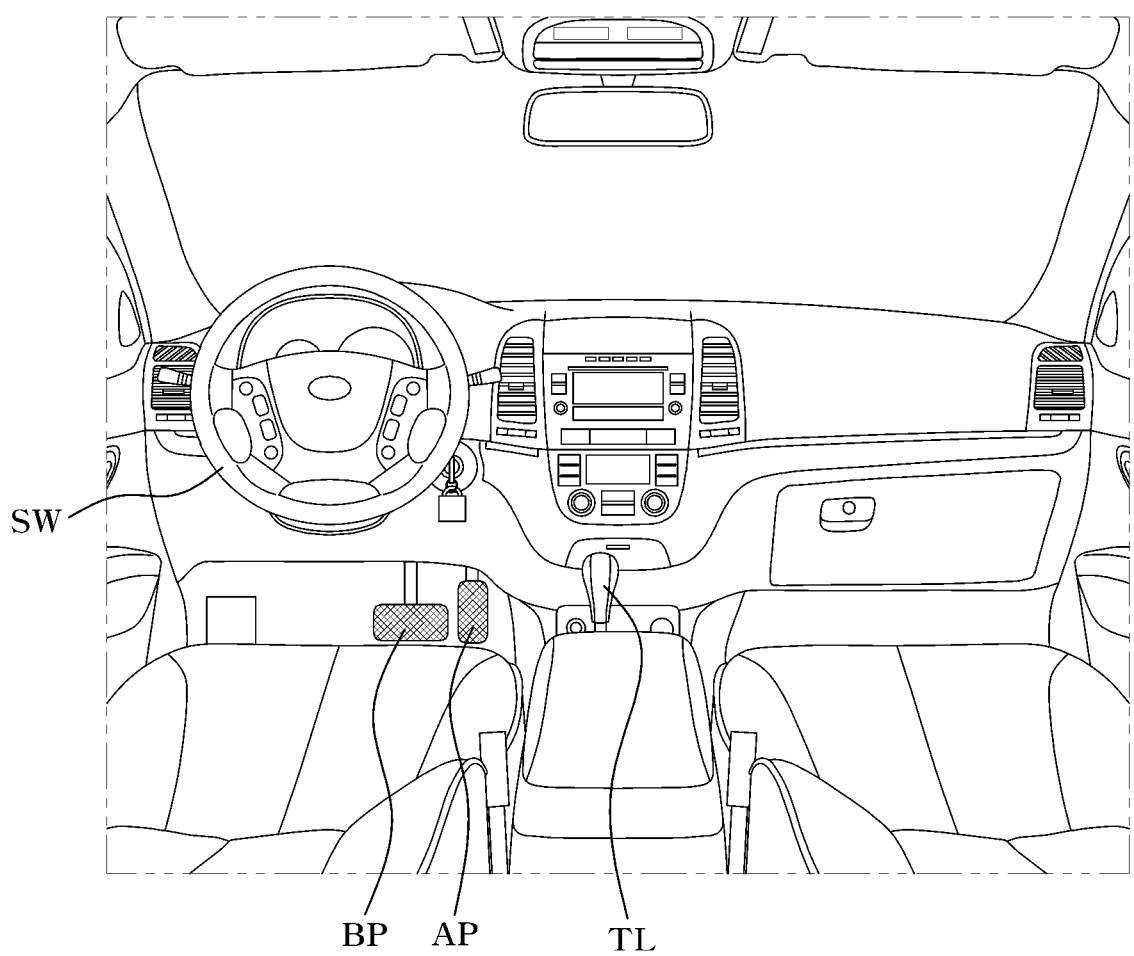
FIG. 1 is a view showing conventional driving-related devices provided in the interior of a vehicle.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes, will be determined in portion by the particular intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments will now be described more fully with reference to the accompanying drawings, in which only some exemplary embodiments are shown. Specific structural and functional details included herein are merely representative for describing exemplary embodiments. The present invention, however, may be embodied in many alternate forms, and may not be construed as being limited only to the exemplary embodiments set forth herein. Accordingly, while exemplary embodiments of the present invention are configured for being variously modified and taking alternative forms, embodiments thereof are shown by way of example in the drawings and will herein be described in detail. It may be understood, however, that there is no intent to limit the present invention to the exemplary embodiments disclosed. On the other hand, various exemplary embodiments are to cover all modifications, equivalents, and alternatives falling within the scope of the present invention.

It will be understood that, although the terms "first", "second", etc. may be used herein to describe various elements, these elements may not be limited by these terms. These terms are only used to distinguish one element from another. For example, a first element could be termed a second element, and similarly, a second element could be termed a first element, without departing from the scope of the exemplary embodiments of the present invention.

It will be understood that when an element is referred to as being "connected" or "coupled" to another element, it may be directly connected or coupled to the other element, or intervening elements may be present. In contrast, when an element is referred to as being "directly connected" or "directly coupled" to another element, there are no intervening elements present. Other words used to describe the relationship between elements may be interpreted in a like fashion (e.g., "between" versus "directly between", "adjacent" versus "directly adjacent", etc.).

Wherever possible, the same reference numbers will be used throughout the drawings to refer to the same or like parts. The terminology used herein is for describing various exemplary embodiments only and is not intended to be limiting of exemplary embodiments of the present invention. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, components, and/or groups thereof, but do not preclude the presence or addition of one or more other features, integers, steps, operations, elements, components, and/or groups thereof.

An integrated driving control device according to various exemplary embodiments of the present invention is formed in a unitary structure to perform steering, acceleration, deceleration and shifting of a vehicle.

Hereinafter, various exemplary embodiments of the present invention will be described in detail with reference to the accompanying drawings.

Figure 2:
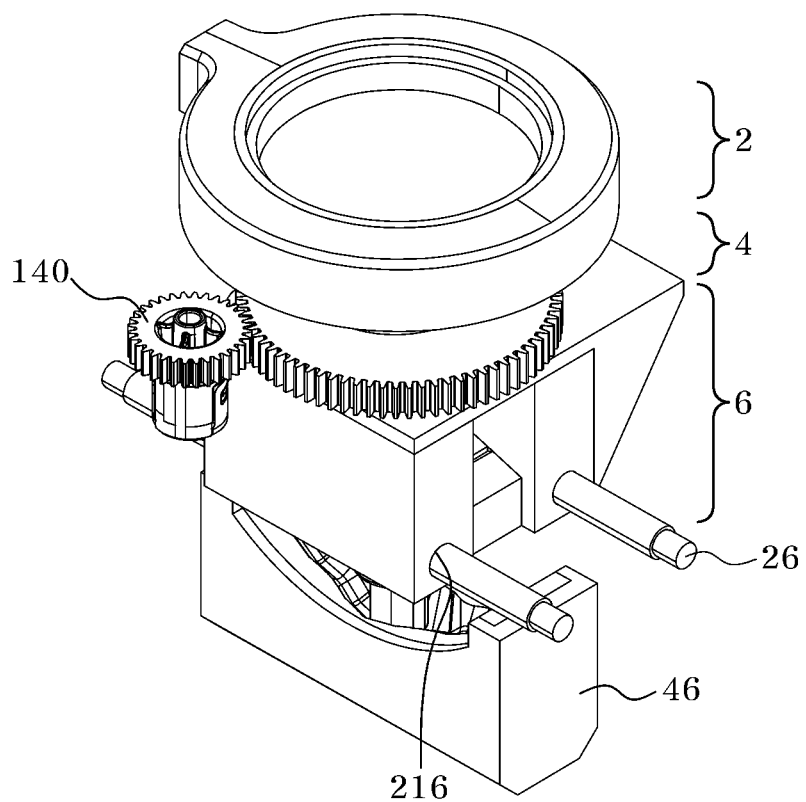
FIG. 2 is a perspective view of an integrated driving control device according to various exemplary embodiments of the present invention.
Figure 3:
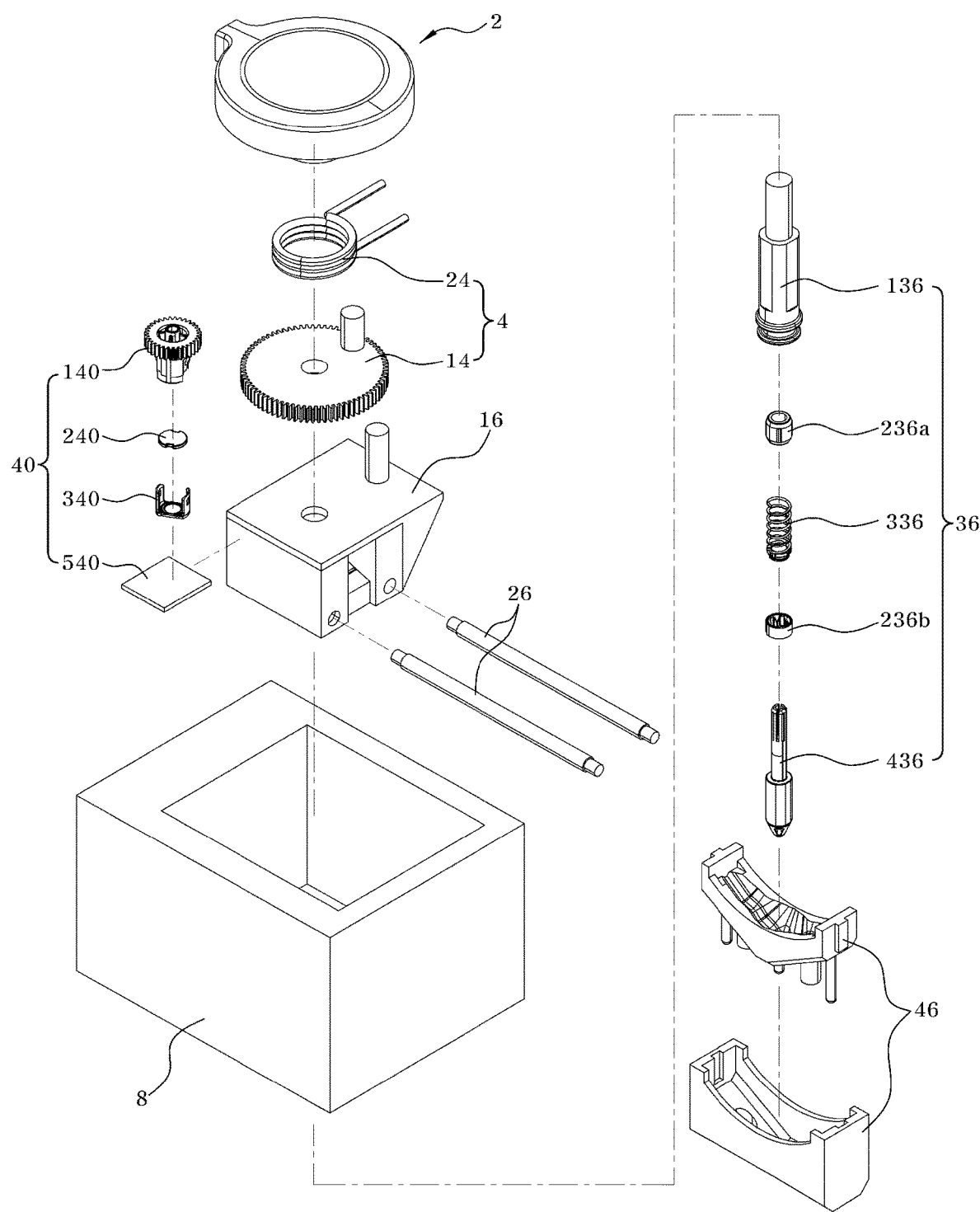
FIG. 3 is an exploded perspective view of the integrated driving control device according to various exemplary embodiments of the present invention.

FIG. 2 is a perspective view of an integrated driving control device according to various exemplary embodiments of the present invention, and FIG. 3 is an exploded perspective view of the integrated driving control device according to various exemplary embodiments of the present invention.

The integrated driving control device according to various exemplary embodiments of the present invention is formed in a unitary structure configured for integrally controlling steering, acceleration, deceleration and shifting of a vehicle. To the present end portion, as shown in FIG. 2 and FIG. 3, the integrated driving control device according to various exemplary embodiments of the present invention may include a knob unit 2, a rotating unit 4, and a sliding unit 6.

According to various exemplary embodiments of the present invention, steering of the vehicle is controlled through rotation of the knob unit 2, and acceleration, deceleration and shifting of the vehicle are controlled through sliding movement of the knob unit 2. According to various exemplary embodiments of the present invention, the rotating unit 4 is configured to control steering of the vehicle in a response to rotation of the knob unit 2, and the sliding unit 6 is configured to control acceleration, deceleration and shifting of the vehicle in a response to sliding movement of the knob unit 2 in a first direction or a second direction thereof.

The integrated driving control device according to various exemplary embodiments of the present invention includes the knob unit 2. Being rotatable and slidable, the knob unit 2 is operated by a user. The knob unit 2 is rotatable in both directions, i.e., in a clockwise or counterclockwise direction thereof. Furthermore, the knob unit 2 is linearly movable in a first direction or a second direction which is opposite to the first direction thereof. For example, when the first direction is the east direction thereof, the second direction is the west direction thereof, and when the first direction is the north direction thereof, the second direction is the south direction thereof.

Figure 4A:
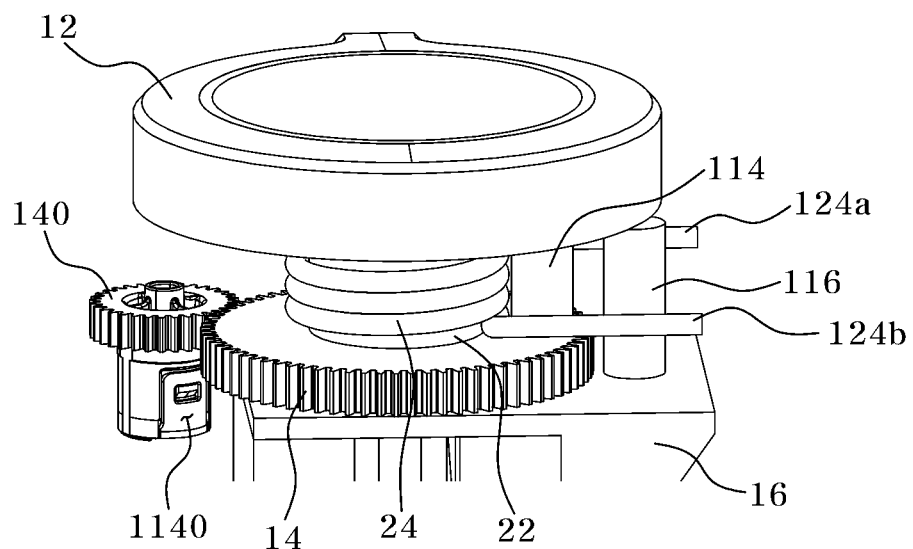
FIG. 4A is a view of a knob unit and a rotating unit of the integrated driving control device according to various exemplary embodiments of the present invention.
Figure 4B:
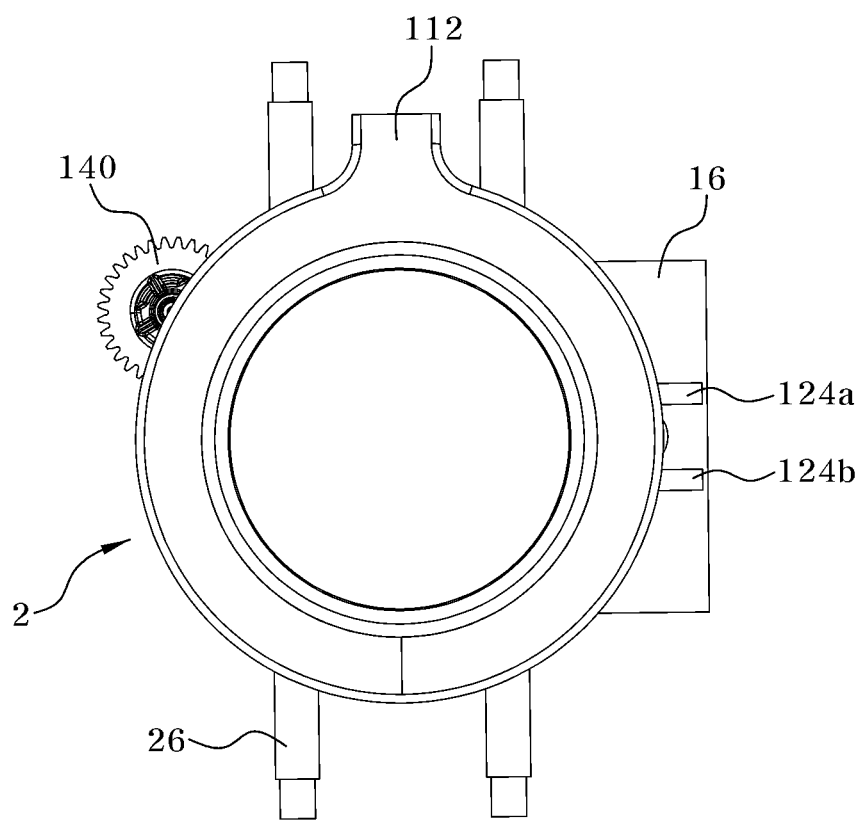
FIG. 4B is a plan view of FIG. 4A.

FIG. 4A is a perspective view of the knob unit of the integrated driving control device according to various exemplary embodiments of the present invention, and FIG. 4B is a plan view of the integrated driving control device according to various exemplary embodiments of the present invention.

As shown in FIG. 4A and FIG. 4B, according to various exemplary embodiments of the present invention, the knob unit 2 includes a grip portion 12 and a rod 22.

The grip portion 12 is a portion which is gripped by a user. The grip portion 12 may include a position-indicating portion 112 which indicates the angular position of the knob unit 2. According to various exemplary embodiments of the present invention, the position-indicating portion 112 may protrude farther than any other portion of the grip portion 12 or may be provided with a projection to enable the user to easily recognize the angular position of the knob unit 2.

The rod 22 may extend from the grip portion 12 and may have a smaller cross-sectional area than the grip portion 12.

The rotating unit 4 is configured to control steering of the vehicle in a response to rotation of the knob unit 2 and includes a first gear 14 and a torsion spring 24.

The first gear 14 is connected to the knob unit 2. The first gear 14 may be connected to the knob unit 2 via the rod 22. A plurality of teeth is formed in the circumference of the first gear 14. According to various exemplary embodiments of the present invention, the first gear 14 is disposed coaxially with the knob unit 2. The first gear 14 is configured to rotate together with the knob unit 2 in a response to rotation of the knob unit 2.

The first gear 14 may have a protrusion 114 protruding from the surface of the first gear 14. The protrusion 114 protrudes toward the grip portion 12 and is disposed parallel to an elevated portion 116, which will be described later. The protrusion 114 is not limited to a specific shape and may be formed in any of various shapes, so long as it is capable of supporting opposite end portions of the torsion spring 24.

According to various exemplary embodiments of the present invention, the rotating unit 4 includes the torsion spring 24. The torsion spring 24 provides the user with reaction force with respect to rotation of the knob unit 2 or rotation of the knob unit 2 and the first gear 14. The torsion spring 24 is configured to return the knob unit 2 to an original position thereof after the knob unit 2 is rotated. The torsion spring 24 includes a first leg 124*a* and a second leg 124*b*.

According to various exemplary embodiments of the present invention, the torsion spring 24 may be mounted between the knob unit 2 and the first gear 14. The torsion spring 24 may be fitted on the rod 22. When the user rotates the knob unit 2 to steer the vehicle, the torsion spring 24 is configured to provide reaction force to the user and to provide restoring force to the knob unit 2, by which the knob unit 2 is returned to the original position. Referring again to FIG. 4A, according to various exemplary embodiments of the present invention, with the protrusion 114 and the elevated portion 116 being disposed parallel to and adjacent to each other, the first leg 124*a* of the torsion spring 24 is disposed to be in contact with one side of the protrusion 114 and one side of the elevated portion 116, and the second leg 124*b* of the torsion spring 24 is disposed to be in contact with the opposite side of the protrusion 114 and the opposite side of the elevated portion 116. Due to the present configuration, the torsion spring 24 generates reaction force during rotation of the knob unit 2.

Figure 5:
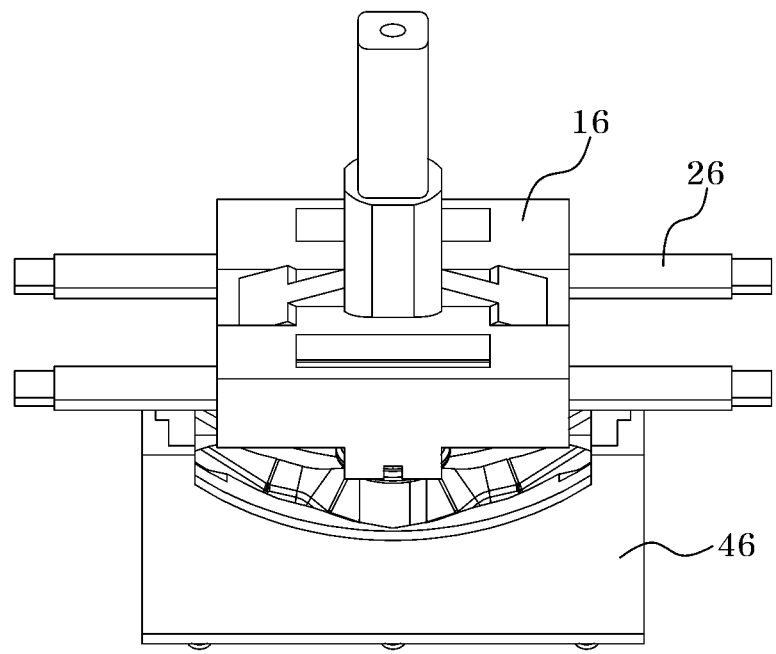
FIG. 5 is a view of a sliding unit of the integrated driving control device according to various exemplary embodiments of the present invention.
Figure 6:
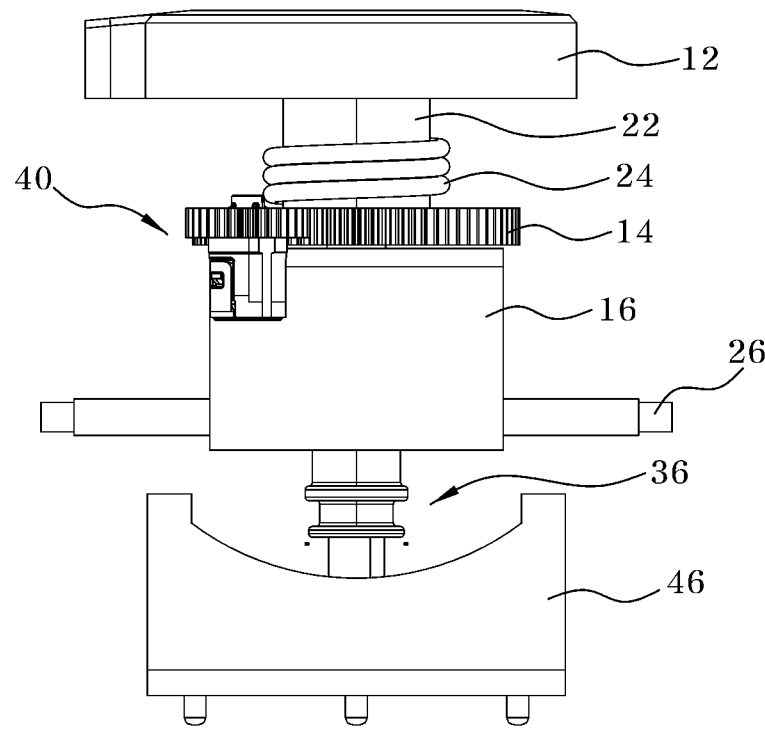
FIG. 6 is a left side view of FIG. 2.

FIG. 5 is a view of the sliding unit of the integrated driving control device according to various exemplary embodiments of the present invention, and FIG. 6 is a side view of the integrated driving control device according to various exemplary embodiments of the present invention.

Referring to FIG. 5 and FIG. 6, the sliding unit 6 is configured to enable the knob unit 2 to linearly slide in a first direction or a second direction which is opposite to the first direction thereof. The sliding unit 6 controls acceleration, deceleration and shifting of the vehicle. The sliding unit 6 includes a slider 16 and a guide member 26. Furthermore, the sliding unit 6 may further include a pedal force transmission portion 36 and an auxiliary member 46.

The slider 16 supports the knob unit 2 and is coupled to the knob unit 2. Therefore, the slider 16 moves together with the knob unit 2 in a response to movement of the knob unit 2. According to various exemplary embodiments of the present invention, the knob unit 2 and the rotating unit 4 may be accommodated on the slider 16.

The elevated portion 116 is formed on the slider 16. The elevated portion 116 is formed to protrude from the surface of the slider 16. As described above, the elevated portion 116 is involved in the operation of the torsion spring 24.

The guide member 26 is coupled to the slider 16 and the slider 16 is slidably connected to the guide member 26. According to various exemplary embodiments of the present invention, the slider 16 has a passage 216 configured to receive the guide member 26. The guide member 26 is inserted into the passage 216, and the slider 16 slides along the guide member 26. The present configuration is a non-limiting example. The present invention is not limited to the present configuration, and the sliding movement of the slider 16 may be implemented through any of various other configurations.

FIG. 1 is an exploded perspective view of the pedal force transmission portion and the auxiliary member of the integrated driving control device according to various exemplary embodiments of the present invention.

Figure 7:
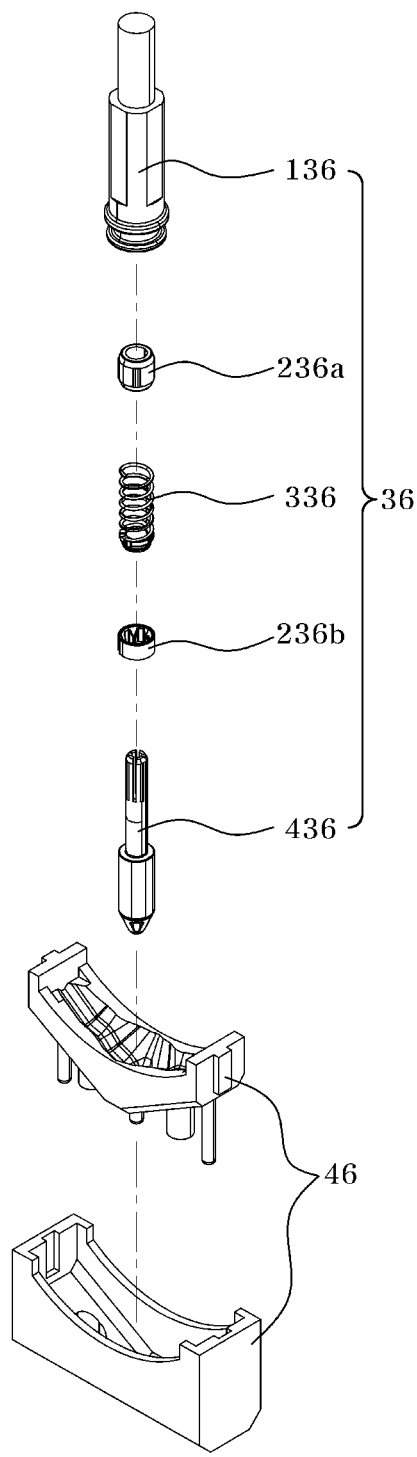
FIG. 7 is an exploded perspective view of a pedal force transmission portion and an auxiliary member of the integrated driving control device according to various exemplary embodiments of the present invention.

Referring to FIG. 7, according to various exemplary embodiments of the present invention, the sliding unit 6 may include the pedal force transmission portion 36 which transmits pedal force to the user and then returns to the original position. The pedal force transmission portion 36 may include an extension member 136, stoppers 236*a* and 236*b*, a spring 336, and a retractable member 436.

The extension member 136 is coupled to the slider 16 and moves together with the slider 16 in a response to movement of the slider 16. The retractable member 436 is coupled to the extension member 136. The retractable member 436 is formed to move into and out of the extension member 136. That is, the protruding length of the retractable member 436 with respect to the extension member 136 is variable. The spring 336 is disposed between the extension member 136 and the retractable member 436. The spring 336 enables the movement of the retractable member 436 into the extension member 136. When the retractable member 436 is pressed, the spring 336 is compressed and the retractable member 436 is pushed into the extension member 136. When the force applied to the retractable member 436 is removed, the retractable member 436 returns to protrude from the extension member 136 to the original protruding length due to the restoring force of the spring 336. The stoppers 236*a* and 236*b* may be disposed at each end portion of the spring 336. The spring 336 is compressed or extended between the stoppers 236*a* and 236*b*.

According to various exemplary embodiments of the present invention, the retractable member 436 is formed such that the cross-sectional area of an end portion of the retractable member 436 is gradually decreased toward its tip and such that the tip portion is smoothly curved. The present configuration is for transmission of pedal force to the user together with grooves 246 to be described later.

Figure 8:
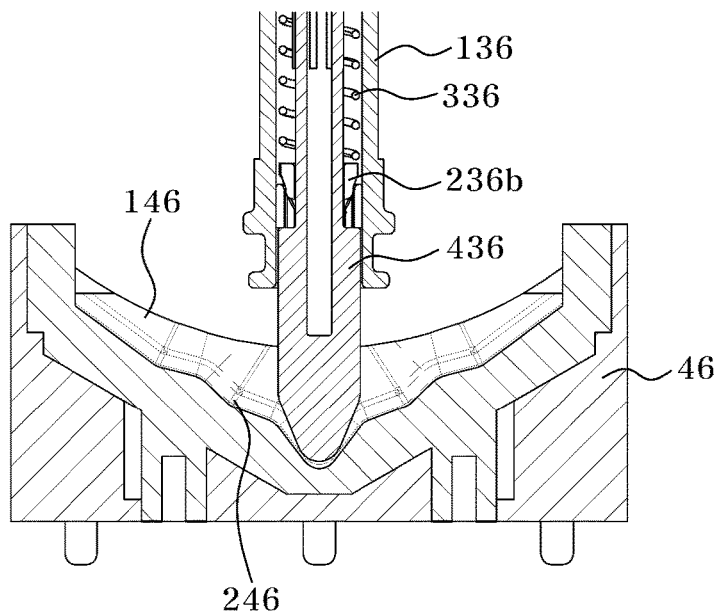
FIG. 8 is a view showing the operation of the pedal force transmission portion and the auxiliary member of the integrated driving control device according to various exemplary embodiments of the present invention.

FIG. 8 is a view showing the operation of the pedal force transmission portion and the auxiliary member of the integrated driving control device according to various exemplary embodiments of the present invention.

As shown in FIG. 8, the sliding unit 6 may further include the auxiliary member 46. The auxiliary member 46 operates together with the pedal force transmission portion 36. The auxiliary member 46 has a motion surface 146 and a plurality of grooves 246 which have different respective sizes, are formed on the motion surface 146. The auxiliary member 46 transmits pedal force to the user together with the pedal force transmission portion 36 when the user performs acceleration or deceleration. The auxiliary member 46 also assists in returning of the pedal force transmission portion 36 to the original position.

The auxiliary member 46 is in contact with the pedal force transmission portion 36 or the retractable member 436 and the pedal force transmission portion 36 is movable on the motion surface 146. That is, movement of the knob unit 2 leads to movement of the slider 16 and the pedal force transmission portion 36 coupled to the slider 16 moves on the auxiliary member 46.

The motion surface 146 of the auxiliary member 46 has an incline. The inclines are formed on opposite sides of the motion surface 146 with respect to a center portion of the motion surface 146 to be inclined in mutually opposite directions. Furthermore, a plurality of grooves 246 are formed in the motion surface 146.

According to various exemplary embodiments of the present invention, a housing 8 may be further included. The guide member 26 may pass through the housing 8 and the slider 16 may slide in a limited space in the housing 8.

Figure 9:
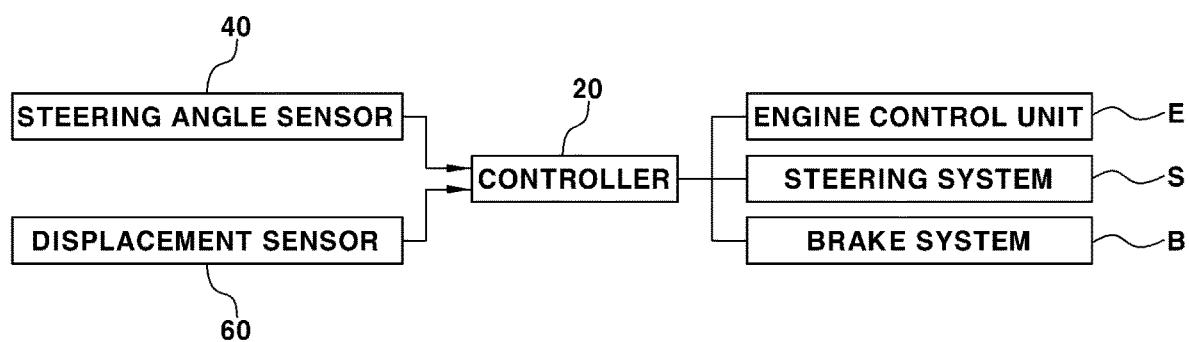
FIG. 9 is a control diagram showing the overall operation of the integrated driving control device according to various exemplary embodiments of the present invention.

FIG. 9 is a control diagram showing the overall operation of the integrated driving control device according to various exemplary embodiments of the present invention.

As shown in FIG. 9, the integrated driving control device according to various exemplary embodiments of the present invention further includes a controller 20 which is configured for communicating with an engine control unit E, a steering system S, and a brake system B of the vehicle. The controller 20 is configured to collect information from a steering angle sensor 40 and a displacement sensor 60 and to transmit the information to the engine control unit E, the steering system S, and the brake system B of the vehicle.

Figure 10:
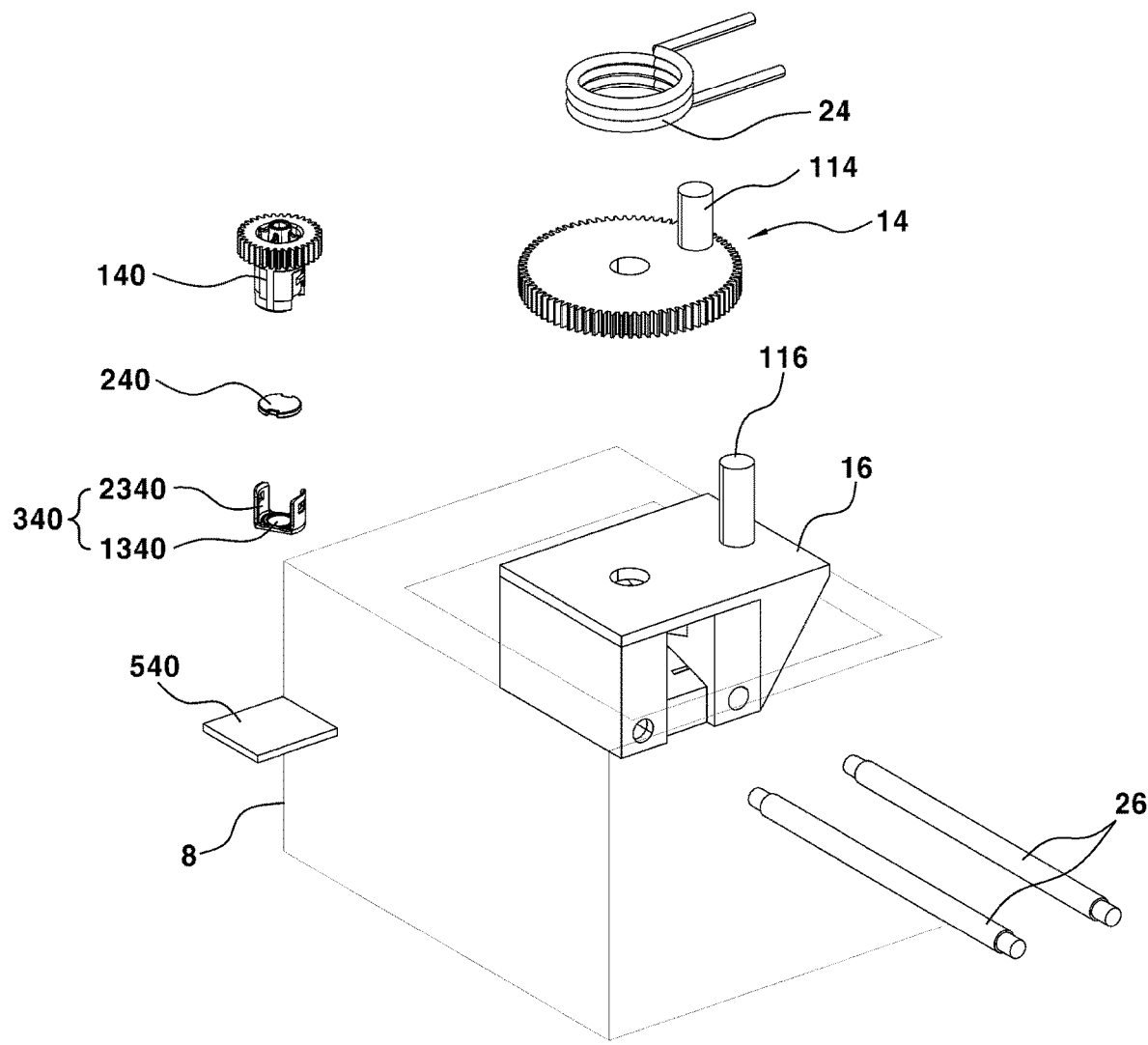
FIG. 10 is an exploded perspective view of a steering angle sensor of the integrated driving control device according to various exemplary embodiments of the present invention.
Figure 11:
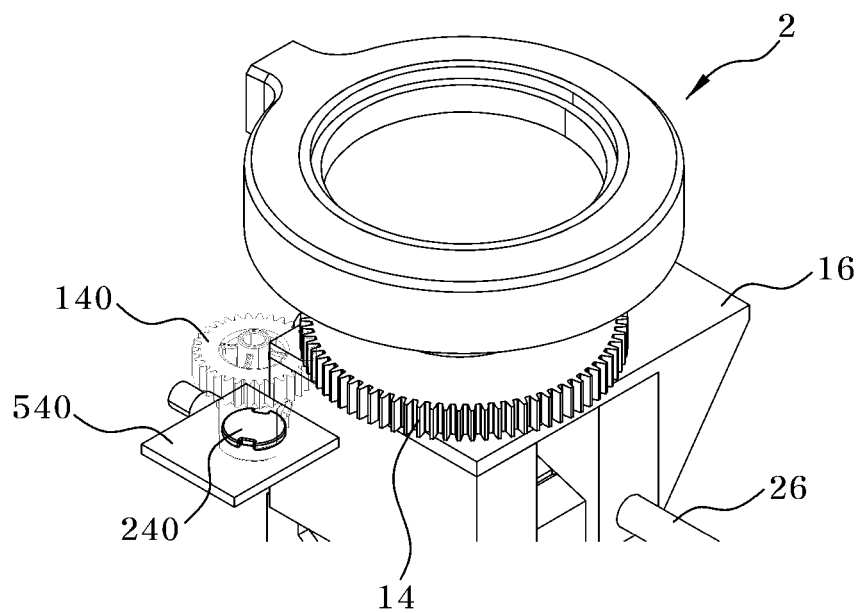
FIG. 11 is a see-through perspective view showing the state in which the steering angle sensor is mounted in the integrated driving control device according to various exemplary embodiments of the present invention.
Figure 12:
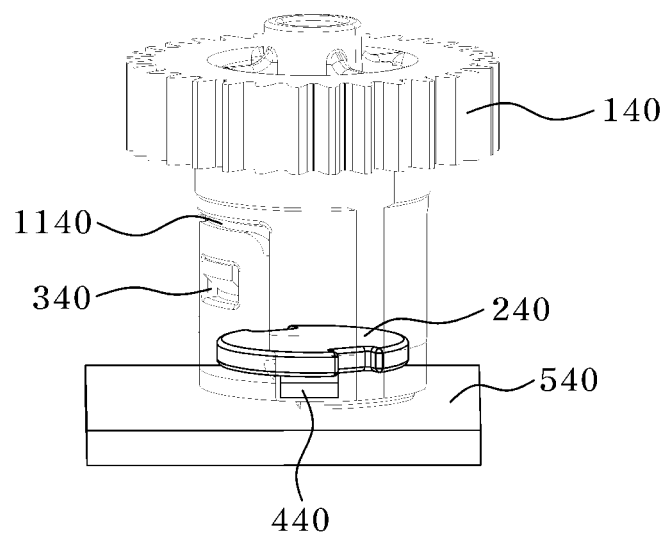
FIG. 12 is a partially enlarged view of the steering angle sensor of FIG. 11.

FIG. 10 is an exploded perspective view of the integrated driving control device according to various exemplary embodiments of the present invention, from which some components are omitted, FIG. 11 is a see-through perspective view of the steering angle sensor, and FIG. 12 is an enlarged see-through perspective view of the steering angle sensor of FIG. 11.

Referring to FIG. 10, FIG. 11, and FIG. 12, the steering angle sensor 40 measures the rotation angle of the knob unit 2 and to transmit the rotation angle to the steering system of the vehicle. The steering system S steers the vehicle based on information input by the steering angle sensor 40. The steering angle sensor 40 may include a second gear 140, a first magnet member 240, a steering-angle-detecting Hall effect sensor 440, and a coupling member 340.

The second gear 140 is disposed at one side of the first gear 14 to be in contact with the first gear 14. The second gear 140 includes a plurality of teeth formed on the circumferential surface to rotate in engagement with the first gear 14. The second gear is referred to using the term "second" to be distinguished from the first gear 14 of the rotating unit 4. However, the second gear is not limited to a gear which is not the same as the first gear 14. The first gear 14 and the second gear 140 may have the same configuration or may have different configurations.

The second gear 140 may have a fitting portion 1140 recessed from the surface of the second gear 140. As a non-limiting example, the fitting portion 1140 is formed to mount the first magnet member 240 to the second gear 140 via the coupling member 340 to be described later.

The first magnet member 240 is mounted to the second gear 140. Accordingly, when the second gear 140 rotates, the first magnet member 240 also rotates together with the second gear 140. According to various exemplary embodiments of the present invention, the first magnet member 240 is disposed around the center portion of the second gear 140. The first magnet member 240 may be disposed on the bottom portion of the center portion of the second gear 140.

The first magnet member 240 may be mounted to the second gear 140 via the coupling member 340. The coupling member 340 includes a plate 1340 supporting the first magnet member 240 and an insertion portion 2340 extending from each side of the plate 1340 in a direction substantially perpendicular to the plate 1340 to be fitted into the second gear 140.

The steering-angle-detecting Hall effect sensor 440 is disposed adjacent to the first magnet member 240. The steering-angle-detecting Hall effect sensor 440 detects a change in a magnetic field caused by a rotation of the first magnet member 240 and measures the rotation angle of the second gear 140. The measured rotation angle is transmitted to the steering system S by the controller 20, and the steering system S controls the travel direction of the vehicle based on the received information.

According to various exemplary embodiments of the present invention, the steering-angle-detecting Hall effect sensor 440 may be mounted on a substrate 540 which is disposed to face the first magnet member 240. As shown in FIG. 11, the substrate 540 is simply coupled to the slider 16 such that the first gear 14 engages with the second gear 140. According to various exemplary embodiments of the present invention, the substrate 540 may include a printed circuit board, and the printed circuit board may include the controller 20.

The displacement sensor 60 detects moving distance and direction of the knob unit 2 or the slider 16. The displacement sensor 60 may include a second magnet member 160 and a displacement-detecting Hall effect sensor 260.

Figure 13:
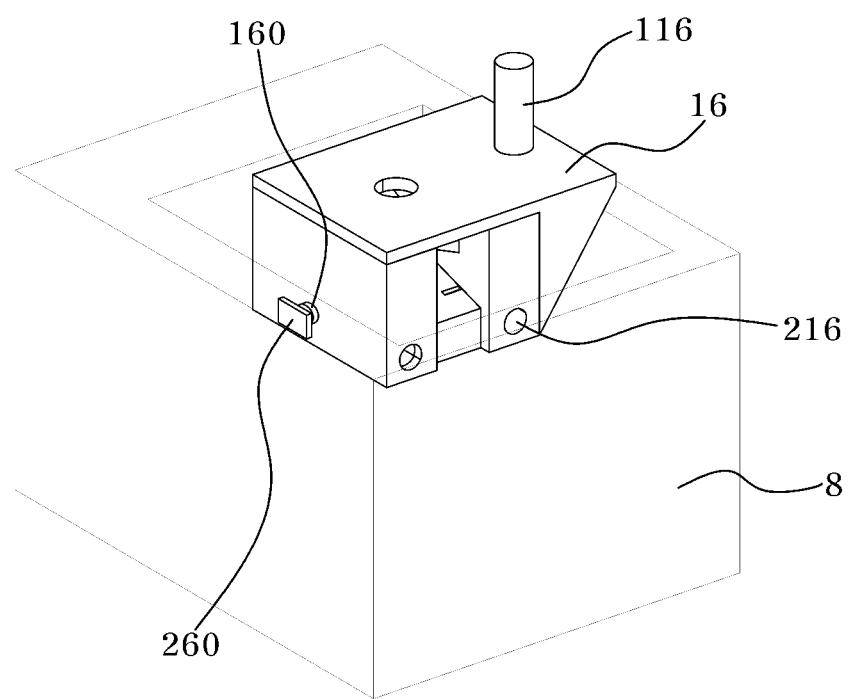
FIG. 13 is a view of a displacement sensor of the integrated driving control device according to various exemplary embodiments of the present invention.

FIG. 13 is a view showing the relationship between the slider and the displacement sensor.

As shown in FIG. 13, according to various exemplary embodiments of the present invention, the second magnet member 160 is mounted to the slider 16, and the displacement-detecting Hall effect sensor 260 is securely mounted around the second magnet member 160. In various exemplary embodiments of the present invention, the displacement-detecting Hall effect sensor 260 is mounted on an internal surface of the housing 8 to be adjacent to the second magnet member 160. The displacement-detecting Hall effect sensor 260 detects a change in the magnetic field caused by movement of the slider 16 to which the second magnet member 160 is mounted and detects the moving distance and the moving direction of the slider 16.

Here, the term "the second magnet member 160" is used to distinguish the same from the first magnet member 240 of the steering angle sensor 40. However, the first magnet member 240 and the second magnet member 160 may have the same configuration or may have different configurations.

The operation and effects of the integrated driving control device according to various exemplary embodiments of the present invention will be described with reference to FIGS. 14 to 16.

Conventionally, a user utilizes an accelerator pedal to accelerate a vehicle, a brake pedal to decelerate a vehicle, a shift lever to control the travel speed of a vehicle, and a steering wheel to steer a vehicle. These driving control devices occupy a large amount of space in the cabin space of the vehicle. That is, a great number of portions forming the above driving control devices are mounted in the vehicle, overcrowding the cabin space of the vehicle, and thus, deteriorating space utilization. Furthermore, the installation of many portions increases the weight of the vehicle and the manufacturing costs.

However, in recent years, with the emergence and development of autonomous driving technology, vehicles have increasingly been provided with automated driving systems. Accordingly, the number of driving mechanisms that are directly operated by a driver has decreased. Due to the present technological development trend, the interior of a vehicle plays a reduced role as a space required for control of the vehicle but is increasingly utilized as a space for relaxation and leisure while the vehicle is traveling.

Considering the present trend, various aspects of the present invention are directed to providing an integrated driving control device into which conventional portions for controlling the vehicle are integrated. According to various exemplary embodiments of the present invention, the vehicle cabin may be spacious, and the weight and manufacturing costs may be reduced.

Furthermore, the present invention advantageously provides improved convenience in driving to drivers whose hands or feet are handicapped.

Figure 14:
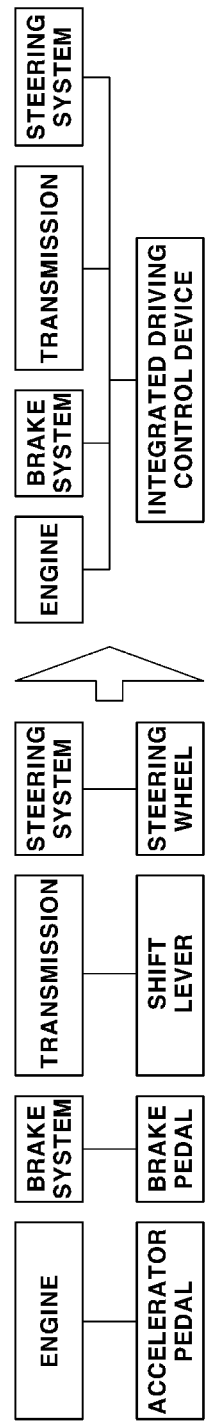
FIG. 14 shows integrated functionalities of the integrated driving control device according to various exemplary embodiments of the present invention, compared to the conventional control device.

As shown in FIG. 14, functions of existing devices, including accelerator pedal, brake pedal, shift lever and steering wheel are integrated into the integrated driving control device according to various exemplary embodiments of the present invention. Accordingly, the vehicle may be controlled by the integrated driving control device of the present invention by communicating with the engine, the brake system, the transmission, and the steering system that work in conjunction with the existing devices.

Figure 15:
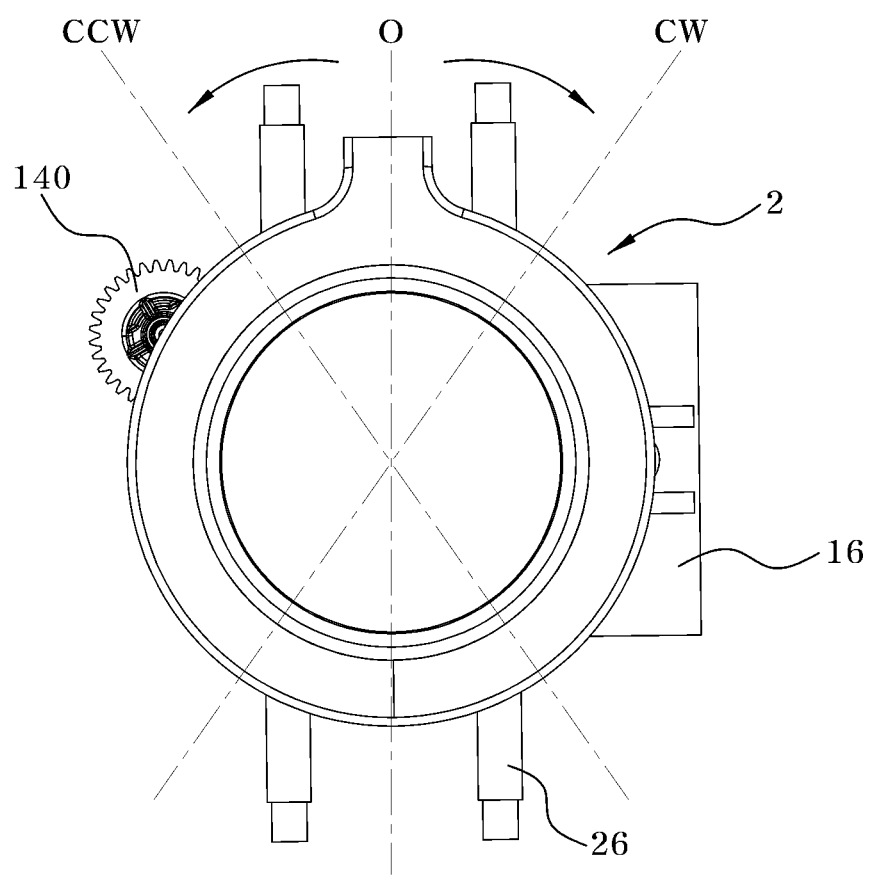
FIG. 15 is a view showing the steering control operation of the integrated driving control device according to various exemplary embodiments of the present invention.

As shown in FIG. 15, the integrated driving control device according to various exemplary embodiments of the present invention includes the knob unit 2 configured to be gripped by a user.

The user grips the grip portion 12 of the knob unit 2 and rotates the knob unit 2 in clockwise direction (CW) or counterclockwise direction CCW, controlling the steering of the vehicle.

The knob unit 2 rotates together with the first gear 14. The second gear 140 of the steering angle sensor 40 rotates in engagement with the first gear 14 rotating. The first magnet member 240 is mounted to the second gear 140, and the steering-angle-detecting Hall effect sensor 440 disposed adjacent to the first magnet member 240 detects the rotation angle of the second gear 140. The controller 20 transmits the rotation angle measured by the steering-angle-detecting Hall effect sensor 440 to the steering system S of the vehicle, and the steering system S steers the vehicle based on the transmitted measurement.

The torsion spring 24 is disposed at the knob unit 2. As described above, the two legs 124a and 124b of the torsion spring 24 are in contact with respective opposite sides of the elevated portion 116, whereby the torsion spring 24 provides the user with reaction force with respect to rotation of the knob unit 2 and returns the knob unit 2 to the original position when the knob unit 2 is released. According to various exemplary embodiments of the present invention, the first leg 124a of the torsion spring 24 is disposed to be in contact with one side of the protrusion 114 and one side of the elevated portion 116, and the second leg 124b of the torsion spring 24 is disposed to be in contact with the opposite side of the protrusion 114 and the opposite side of the elevated portion 116 such that the torsion spring 24 provides the user with reaction force with respect to rotation of the knob unit 2 and provides the knob unit 2 with restoring force. That is, after rotation of the knob unit 2, when the rotating force applied to the knob unit 2 by the user is removed, the torsion spring 24 provides restoring force to the knob unit 2 so that the position-indicating portion 112 returns to its original position.

Figure 16:
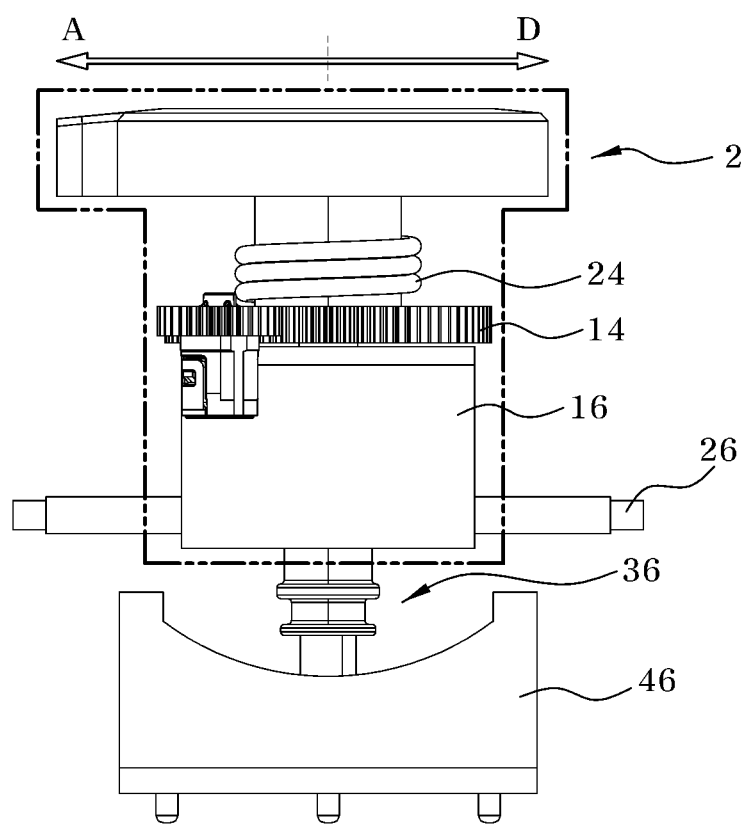
FIG. 16 is a view showing the acceleration, deceleration and shifting control operation of the integrated driving control device according to various exemplary embodiments of the present invention.

To control the speed and travel direction of the vehicle, as shown in FIG. 16, the user slides the knob unit 2 in direction A or direction D. According to various exemplary embodiments of the present invention, when the knob unit 2 moves in direction A, the vehicle is accelerated, and when the knob unit 2 moves in direction D, the vehicle is decelerated.

The knob unit 2 is accommodated on the slider 16, and the slider 16 is formed to be movable along the guide member 26 in direction A or direction D.

The second magnet member 160 is attached to the slider 16, and the displacement-detecting Hall effect sensor 260 is disposed adjacent to the second magnet member 160. When the slider 16 moves, the second magnet member 160 also moves together therewith, and the displacement-detecting Hall effect sensor 260 detects the moving distance and the moving direction of the slider 16 based on a change in the magnetic field caused by the movement of the second magnet member 160 and transmits the collected information to the engine control unit E or the brake system B, facilitating acceleration or deceleration of the vehicle.

Furthermore, the sliding unit 6 according to various exemplary embodiments of the present invention may further include the pedal force transmission portion 36 and the auxiliary member 46 to transmit pedal force to the user during acceleration and deceleration and to provide restoring force to the knob unit 2 when the user stops applying operating force to the knob unit 2.

The retractable member 436 moves along the motion surface 146, and the grooves 246 are formed in the motion surface 146, whereby pedal force is provided to the user during movement of the knob unit 2. Furthermore, since the protruding length of the retractable member 436 to which the retractable member 436 protrudes from the extension member 136 is configured for being changed by the spring 336, restoring force for returning the knob unit 2 to the original position thereof is provided to the knob unit 2 by the restoring force of the spring 336 and the sloped portions formed on the motion surface 146.

According to various exemplary embodiments of the present invention, the operation of shifting to the parking range (P) may be performed as follows.

Figure 17:
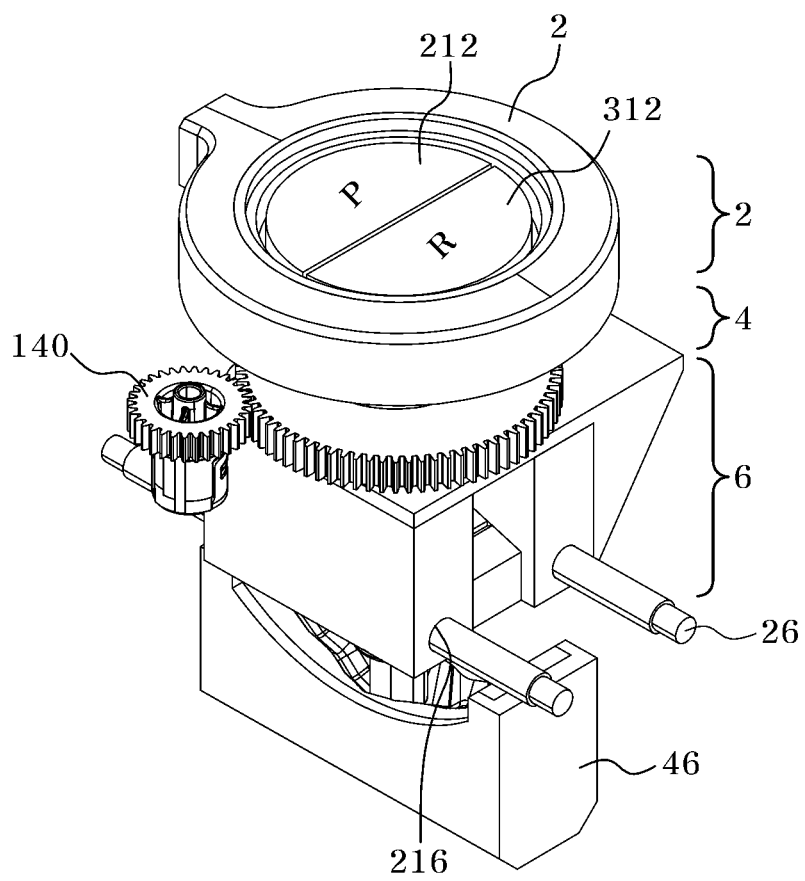
FIG. 17 is a view showing shifting to the parking range (P) and/or to the reverse range (R) using the integrated driving control device according to various exemplary embodiments of the present invention.

According to various exemplary embodiments of the present invention, as shown in FIG. 17, the knob unit 2 may be provided with a P-button 212. When the P-button 212 is pressed, the shift range of the vehicle may be switched to the parking range (P). When the P-button 212 is pressed, the engine control unit E which communicates with the integrated driving control device, may switch the shift range of the vehicle to the parking range (P).

According to various exemplary embodiments of the present invention, the knob unit 2 may not be provided with a P-button, and the shift range of the vehicle may be automatically switched to the parking range (P) when the vehicle is turned off or when the door of the vehicle is opened.

Alternatively, the above two embodiments may be combined. That is, the knob unit 2 may be provided with a P-button, and when the vehicle is turned off or the door of the vehicle is open, the shift range of the vehicle may be automatically switched to the parking range (P).

According to various exemplary embodiments of the present invention, the operation of shifting to the reverse gear shifting step (R) may be performed as follows.

Referring again to FIG. 17, according to various exemplary embodiments of the present invention, the knob unit 2 may be provided with an R-button 312. When the R-button 312 is pressed, the shift range of the vehicle may be switched to the reverse gear shifting step (R). When the R-button 312 is pressed, the engine control unit E which communicates with the integrated driving control device, may switch the shift range of the vehicle to the reverse gear shifting step (R).

According to various exemplary embodiments of the present invention, while the vehicle is stopped, when the knob unit 2 is moved in direction D (refer to FIG. 16) so that the sliding unit 6 which interlocks with the knob unit 2, is moved in direction D, the shift range of the vehicle may be switched to the reverse gear shifting step (R). When the knob unit 2 is moved in direction D while the vehicle is traveling forwards, the vehicle may be decelerated, and when the knob unit 2 is moved in direction D while the vehicle is stopped, the vehicle may travel backwards.

Alternatively, similar to the above-described embodiment related to the shifting to the parking range (P), it will be apparent to those skilled in the art that the above two embodiments related to shifting to the reverse gear shifting step (R) may be combined.

As described above, the integrated driving control device according to various exemplary embodiments of the present invention is formed in a unitary structure configured for integrally controlling acceleration, deceleration, shifting and steering of a vehicle, and exhibits the following effects.

As is apparent from the above description, various aspects of the present invention are directed to providing an integrated driving control device configured for simplifying various vehicle-control-related operation mechanisms that are provided in the interior of a vehicle, such as a steering wheel, an accelerator pedal, a brake pedal, and a shift lever.

Furthermore, according to various exemplary embodiments of the present invention, it is possible to maximize the utilization of the indoor space in a vehicle through simplification of operation mechanisms thereof.

Furthermore, according to various exemplary embodiments of the present invention, it is possible to reduce the weight of a vehicle and the manufacturing costs thereof.

Furthermore, according to various exemplary embodiments of the present invention, it is possible to simplify and facilitate various control operations.

However, the effects achievable through the present invention are not limited to the above-mentioned effects, and other effects not mentioned herein will be clearly understood by those skilled in the art from the above description.

In addition, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An integrated driving control device comprising:
    a knob unit;
    a rotating unit engaged to the knob unit and configured to control steering of a vehicle in a response to a rotation of the knob unit; and
    a sliding unit engaged to the rotating unit and configured to control acceleration and deceleration of the vehicle in a response to sliding movement of the knob unit, wherein the sliding unit includes a slider supporting the knob unit and a guide member slidably coupled to the slider and configured for sliding movement of the slider; and
    a displacement sensor including a second magnet member disposed at the slider and a displacement-detecting Hall effect sensor securely mounted adjacent to the second magnet member and magnetically-engaged to the second magnet member.

2. The integrated driving control device of claim 1, wherein the sliding unit is configured to control shifting of the vehicle in a response to the sliding movement of the knob unit.

3. The integrated driving control device of claim 1, wherein the rotating unit includes a first gear connected to the knob unit and configured to rotate in a response to the rotation of the knob unit.

4. The integrated driving control device of claim 3, further including a steering angle sensor, wherein the steering angle sensor includes:
    a second gear gear-engaged with the first gear and configured to rotate in engagement with the first gear;
    a first magnet member mounted to the second gear; and
    a steering-angle-detecting Hall effect sensor magnetically-engaged to the first magnet member and configured to detect a rotation angle of the second gear according to a change in a magnetic field caused by a rotation of the first magnet member.

5. The integrated driving control device of claim 3, further including:
    a torsion spring coupled to the knob unit and the first gear and configured to provide reaction force with respect to the rotation of the knob unit and the first gear.

6. The integrated driving control device of claim 1, wherein the displacement-detecting Hall effect sensor is configured to detect a moving direction and a moving distance of the slider according to a change in a magnetic field caused by movement of the second magnet member.

7. The integrated driving control device of claim 1, further including a pedal force transmission portion, wherein the pedal force transmission portion includes:
    an extension member extending from the slider; and
    a retractable member slidably coupled to the extension member and having a length adjustable relative to the extension member.

8. The integrated driving control device of claim 7, further including an elastic member mounted between the extension member and the retractable member, so that the elastic member enables a movement of the retractable member into the extension member.

9. The integrated driving control device of claim 7, further including an auxiliary member, wherein the auxiliary member includes:
  a motion surface on which the retractable member is movable; and
  at least a groove concavely formed in the motion surface.

10. The integrated driving control device of claim 8, wherein an end portion of the retractable member configured to be in contact with an auxiliary member includes a cross-sectional area that decreases toward a tip portion of the end portion of the retractable member and the tip portion has a curved shape.

11. The integrated driving control device of claim 1, wherein the knob unit is provided with at least one of a P-button for shifting to a parking range of the vehicle or an R-button for shifting to a reverse gear shifting step of the vehicle.

12. The integrated driving control device of claim 2,
  wherein the knob unit is configured to be movable in one of a first direction and a second direction opposite to the first direction,
  wherein when the knob unit is moved in the first direction while the vehicle is traveling, the vehicle is decelerated, and
  wherein when the knob unit is moved in the first direction while the vehicle is stopped, the vehicle travels backwards.

13. An integrated driving control device comprising:
  a knob unit;
  a rotating unit engaged to the knob unit and configured to control steering of a vehicle in a response to a rotation of the knob unit;
  a sliding unit engaged to the rotating unit and configured to control acceleration and deceleration of the vehicle in a response to sliding movement of the knob unit, wherein the sliding unit includes a slider supporting the knob unit and a guide member slidably coupled to the slider and configured for sliding movement of the slider; and
  a pedal force transmission portion, wherein the pedal force transmission portion includes an extension member extending from the slider and a retractable member slidably coupled to the extension member and having a length adjustable relative to the extension member.

14. The integrated driving control device of claim 13, further including an elastic member mounted between the extension member and the retractable member, so that the elastic member enables a movement of the retractable member into the extension member.

15. The integrated driving control device of claim 13, further including an auxiliary member, wherein the auxiliary member includes:
  a motion surface on which the retractable member is movable; and
  at least a groove concavely formed in the motion surface.

16. The integrated driving control device of claim 15, wherein an end portion of the retractable member configured to be in contact with the auxiliary member includes a cross-sectional area that decreases toward a tip portion of the end portion of the retractable member and the tip portion has a curved shape.

17. The integrated driving control device of claim 13, wherein the sliding unit is configured to control shifting of the vehicle in a response to the sliding movement of the knob unit.

18. The integrated driving control device of claim 13, wherein the rotating unit includes a first gear connected to the knob unit and configured to rotate in a response to the rotation of the knob unit.

19. The integrated driving control device of claim 13, wherein the knob unit is provided with at least one of a P-button for shifting to a parking range of the vehicle or an R-button for shifting to a reverse gear shifting step of the vehicle.

* * * * *